Feb. 8, 1966  A. URBAITIS  3,233,402
POWER SAW CHAIN BREAKER AND REPAIR TOOL
Filed Dec. 2, 1963  2 Sheets-Sheet 1

INVENTOR
Antanas Urbaitis

Feb. 8, 1966   A. URBAITIS   3,233,402
POWER SAW CHAIN BREAKER AND REPAIR TOOL
Filed Dec. 2, 1963   2 Sheets-Sheet 2

INVENTOR
Antanas Urbaitis

United States Patent Office 3,233,402
Patented Feb. 8, 1966

3,233,402
POWER SAW CHAIN BREAKER AND REPAIR TOOL
Antanas Urbaitis, 148 High Park Ave.,
Toronto, Ontario, Canada
Filed Dec. 2, 1963, Ser. No. 327,210
3 Claims. (Cl. 59—7)

This invention relates to a chain saw repair tool but more particularly to a chain breaker adaptable to be used to remove links from the chain of a chain saw for repair purposes.

Broadly, the invention comprises a body member on which are mounted for operation therewith a press for removing rivets which secure the links of a chain together, a rivet refacer and a rivetting device.

Presently, chain saws are commonly used by woodsmen, but the maintenance of the chain presents some problems, particularly when the chain becomes damaged on the site. Woodsmen generally have to walk back to the repair shop which is quite frequently a good distance away from where they are working, resulting in a loss of valuable time. In order to overcome this objection, I have devised the present invention which is very efficient, of such a size that it can be carried in the pocket of a jacket and which is complete in itself. In other words, the tool is used to break the damaged chain, to reface the rivet which has been removed and to reassemble the chain.

The main object of the invention is therefore the provision of a tool to break and reassemble damaged or stretched chains of a chain saw.

Another object is the provision of a rivet refacer and a rivetting device in association with the tool.

Still another object is the provision of a tool as set forth which is small enough in size to be carried in the pocket of a jacket.

Other apparent objects are the provision of a tool of the character set forth which is strong and durable, inexpensive to produce and extremely efficient in servicing damaged or stretched chain of chain saws, or any other type of chains where the links are rivetted together.

With these and other objects in view that may appear as the description proceeds the invention consists in the novel arrangement of cooperating elements as hereinafter more specifically set forth, claimed and shown in the accompanying drawing forming part of this application and in which:

Figure 1:
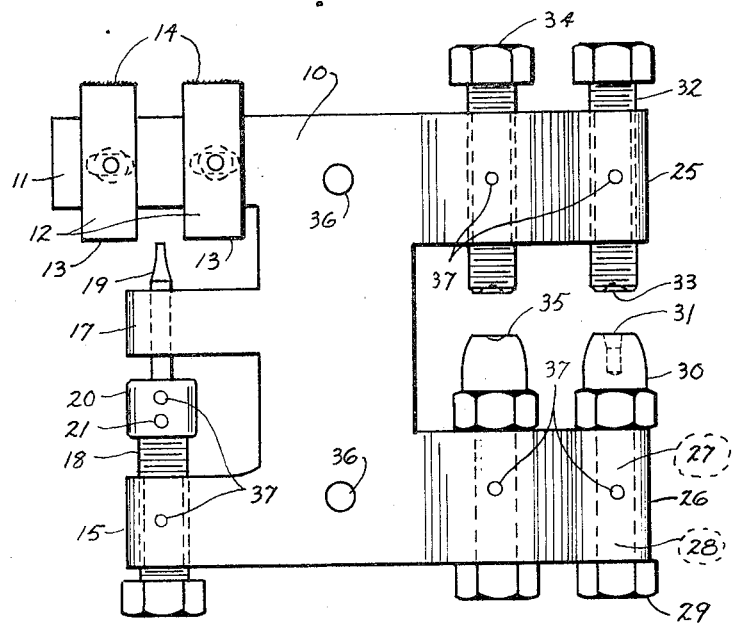
FIGURE 1 is a plan view of a chain breaker constructed in accordance with the present invention.
Figure 2:
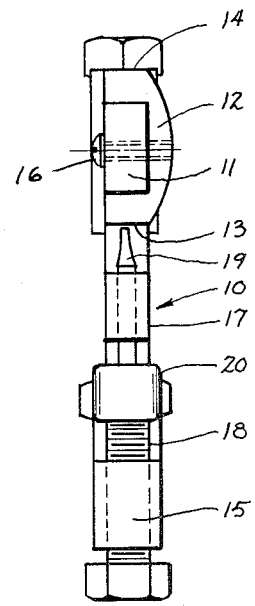
FIGURE 2 is an end elevational view of FIGURE 1.

Referring more in detail to the drawing in which similar reference characters designate corresponding parts throughout the several views, it will be seen the invention comprises a frame 10 formed with a plurality of extending arms, the function of which will hereinafter be more specifically set forth.

As may be seen in the accompanying drawing the invention provides a rivet extractor which consists of an extending arm 11 on which are adjustably mounted a pair of anvils 12 having a smooth surface 13 and a rough or finely knurled surface 14. Since different makes of chain have a different finish, that is some are much smoother than others and tend to slide off the anvil more easily is the reason why the anvil is provided with a smooth and a roughened face. The anvils are adjustably secured on the arm 11 by screws 16 extending through slots in the arm to accommodate the large and the narrow links.

On the corner of the frame directly opposite arm 11 is a further arm 15 within which is mounted a rivet punch for the purpose of extracting a rivet when it is desired to change a damaged or broken link on a chain. A further guide arm 17 maintains the punch in perfect alignment with the anvils. The punch, per se, consists of a stud 18 engaged in a threaded hole formed at the outer extremity of arm 15 and provided with a punch 19 extending through a hole formed in the arm 17. To prevent the punch from rotating when the stud 18 is rotated to drive out a rivet, a coupling 20 is secured to the inner extremity of the stud and securely held thereon by means of a rivet 21. The punch 19 is formed with a shoulder 22 which is disposed within the coupling and a depression 23 is formed on the inner extremity of the stud 18 and the inner face of the shoulder 22 to accommodate a ball 24 to reduce the friction between the stud and the punch, so that the punch will not rotate when the stud is rotated.

To remove a rivet from a link, the anvils are set to support the link and the punch 19 is brought against the face of the rivet. By rotating the stud 18 the rivet is pushed out of its socket after which a damaged or broken link may be removed and exchanged for a new link.

A rivet that has been removed may be used again providing it is refaced and the burrs and rough edge brought back in line with the body of the rivet. The invention provides a refacer.

On the opposite edge of the body from the one above described two more arms 25 and 26 are formed and at the outer extremity of said arms is positioned a refacer. The said refacer comprises a rotatable member 27 mounted in the arm 26 comprising a shank 28 formed with a head 29 and a hardened tip 30 provided with a tapered hole 31 centrally thereof. A push member 32 mounted in arm 25 is positioned in direct axial alignment with said rotatable member and comprises a stud formed with a slight indentation 33 on the face of its inner extremity much like the depression 23 formed on the stud 18.

To reface a rivet, the said rivet is inserted into the tapered hole 31 as far as it will go. By lowering the push member 32 until the face comes in contact with the rivet head well seated into the depression and applying slight pressure and rotating the rotatable member 27 the burr is compressed back to its original position. By repeating this process several times a slight taper is reformed on the body of the rivet and the same may be used over again, since in its refaced condition it will easily re-enter into the link and may be rivetted.

To compress the rivet and form a new rivet head the invention provides a rivetter. The rivetter consists of a push member 34 identical in construction to the push member 32 of the refacer and a rotatable member. The rotatable member is identical in construction to the above described refacer with the exception that in lieu of a tapered hole, the said member is provided with a flat face 35 provided with a plurality of fine ribs or knurl for the purpose of pushing out a new head and removing the rough surface from said head when the member is rotated.

To assure efficient operation and long life of both the refacer and the rivetter, the tip of both rotatable members are hardened. If it is desired to secure the tool to a work bench or a support of some kind, I provide holes 36 through the frame for securing purposes.

Figure 3:
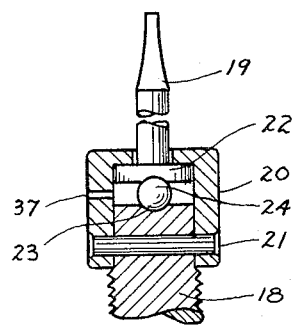
FIGURE 3 is an enlarged detail of the rivet extractor.
Figure 4:
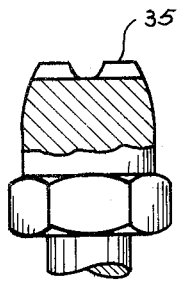
FIGURE 4 is an enlarged detail of the rivet crusher.
Figure 5:
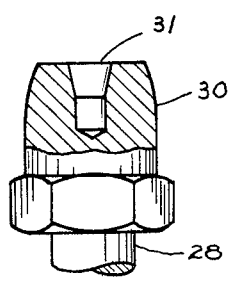
FIGURE 5 is an enlarged detail of the rivet resurfacer.
Figure 6:
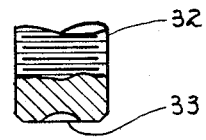
FIGURE 6 is an enlarged detail of the holding member used in conjunction with the crusher and the rivet resurfacer rivet.

In the drawing and particularly to FIGURES 1 and 3, the reference numeral 37 denotes an oiling aperture to facilitate the operation of the device.

It is believed that the construction and advantages have been fully set forth and that further detailed description is not required.

While the preferred embodiment of the invention has been disclosed it is understood that minor modifications may be resorted to without departing from the spirit of the invention and the scope of the claims.

The embodiments of the invention in which an exclusive property or privilege is claimed are defined as follows:

1. A chain breaker comprising a frame body, a plurality of arms formed on said frame on each lateral side of said body, a rivet extractor mounted on one side of said body, and a rivet refacer and a rivetter mounted on the opposite side of said body, said rivet extractor comprising adjustable anvils having a smooth face and a rough face adjustably mounted on one of said arms, a punch for forcing rivets out of their sockets mounted on a further arm on the same side as said anvils and in direct alignment therewith, said punch comprising a stud formed with a head, a coupling at the inner extremity of said stud secured thereto by means of a rivet, a rivet punch formed with a shoulder disposed within said coupling, a ball between said shoulder and said stud to reduce the friction between said stud and said shoulder and a guide arm to direct said punch between said adjustable anvils.

2. In a device as claimed in claim 1, said rivet refacer mounted on a pair of arms on the edge opposite to the rivet extractor, said refacer comprising a rotatable member formed with a tapered hole medially of the inner end of said member, a head for rotating said member on the opposite end, a push member on another arm on said same side of said body in direct axial alignment with said rotatable member and a depression formed on the inner extremity of said push member to retain the head of a rivet when refacing.

3. In a device as claimed in claim 1, said rivetter is mounted inwardly of said refacer and on the same arms and consisting of a rotatable member formed with a shank and a rotating head and an inwardly disposed tip provided with a knurled face and a push member adapted to compress a rivet against said knurled tip, said push member provided with a depression at its inner extremity to receive the head of a rivet to be rivetted therewith.

References Cited by the Examiner

UNITED STATES PATENTS

| | | | |
|---|---|---|---|
| 626,802 | 6/1899 | Zamboni | 78—46 |
| 1,000,867 | 8/1911 | Widmayer | 59—7 |
| 1,008,424 | 11/1911 | McKinney | 78—46 |
| 1,305,766 | 6/1919 | Bullard | 78—52 |
| 3,063,236 | 11/1962 | Cannon | 59—7 |
| 3,138,977 | 6/1964 | Aitken | 78—6 |
| 3,156,087 | 11/1964 | Granberg | 59—7 |

FOREIGN PATENTS

| | | |
|---|---|---|
| 917,700 | 1/1947 | France. |
| 516,262 | 1/1931 | Germany. |

CHARLES W. LANHAM, *Primary Examiner.*

G. P. CROSBY, *Assistant Examiner.*